United States Patent [19]

Pekar et al.

[11] Patent Number: 4,704,000
[45] Date of Patent: Nov. 3, 1987

[54] VISION ENHANCING SYSTEM

[75] Inventors: Jaroslaw Pekar, Chapel Hill; Robert L. Beadles, Durham, both of N.C.

[73] Assignee: Research Triangle Institute, Durham, N.C.

[21] Appl. No.: 175,412

[22] Filed: Aug. 5, 1980

[51] Int. Cl.$^4$ ............... G02B 27/02; G02B 23/08; G02B 7/02; G02C 7/14
[52] U.S. Cl. ................ 350/145; 350/146; 350/249; 350/540; 350/569; 351/41; 351/50; 351/158
[58] Field of Search .......... 350/145, 146, 249, 51, 350/52, 540, 569; 351/41, 50, 158

[56] References Cited

U.S. PATENT DOCUMENTS

| | | | |
|---|---|---|---|
| 1,610,553 | 12/1926 | Jones | 350/145 |
| 1,795,424 | 3/1931 | Cover | 350/47 |
| 2,226,941 | 12/1940 | Montalvo-Guenard . | |
| 2,255,197 | 9/1941 | Thomas | 350/145 |
| 2,710,560 | 6/1955 | Thompson | 350/51 |
| 3,273,456 | 9/1966 | Feinbloom . | |
| 3,410,638 | 11/1968 | Langworthy | 350/52 X |
| 3,865,468 | 2/1975 | Holcomb . | |
| 3,893,135 | 7/1975 | Matsui et al. . | |
| 3,945,712 | 3/1976 | Crock et al. | 351/6 |

FOREIGN PATENT DOCUMENTS

| | | |
|---|---|---|
| 307763 | 10/1919 | Fed. Rep. of Germany ........ 350/52 |
| 2172892 | 10/1973 | France . |
| 579378 | 7/1976 | Switzerland . |

OTHER PUBLICATIONS

"Lens Provides New Point of View"; *The News and Observer*, Raleigh, N.C., Mar. 7, 1979.
Rapport, Specialmummer, May 1976.

*Primary Examiner*—Bruce Y. Arnold
*Assistant Examiner*—Scott J. Sugarman
*Attorney, Agent, or Firm*—Cushman, Darby & Cushman

[57] ABSTRACT

A sight-facilitating apparatus is provided capable of providing magnifications of about 4X to 8X in an aesthetically pleasing manner. An elongated casing has a light entry at one portion thereof and a light exit at an opposite portion thereof. A prismatic telescopic lens system including an objective, an ocular, and the like is mounted within the casing so that light entering the casing throught the light entry passes through the lens system and exits the light exit, with provision for adjusting the focus of the lens system. The objective is mounted within the casing so that the majority of the focal length thereof extends parallel to the direction of elongation of the casing, the light from the first optical element of the lens system being directed along the direction of elongation of the casing. The casing is preferably mounted on top of or incorporated into an eyeglass frame, between the ear pieces, so that the direction of elongation of the casing extends substantially horizontally between the wearer's eyes, with the light exit adjacent a wearer's eye. The wearer may look through the eyeglass lenses and then by tilting his/her eyes with respect to his/her head an angle of about 10°, look through the light exit.

37 Claims, 7 Drawing Figures

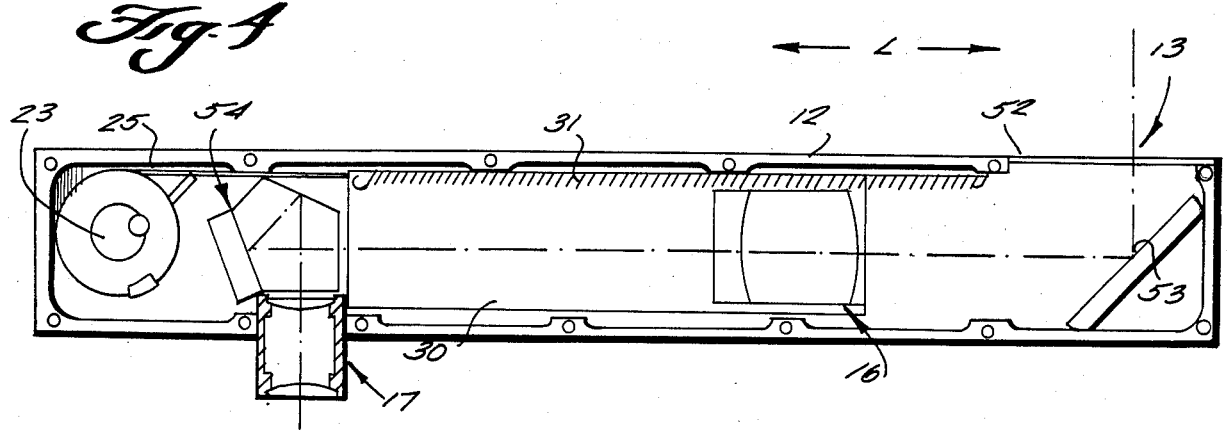
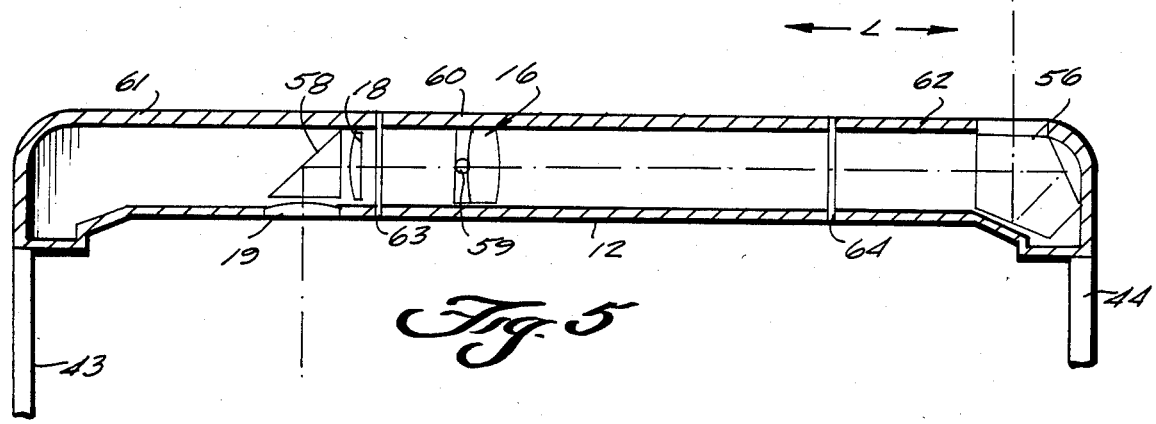
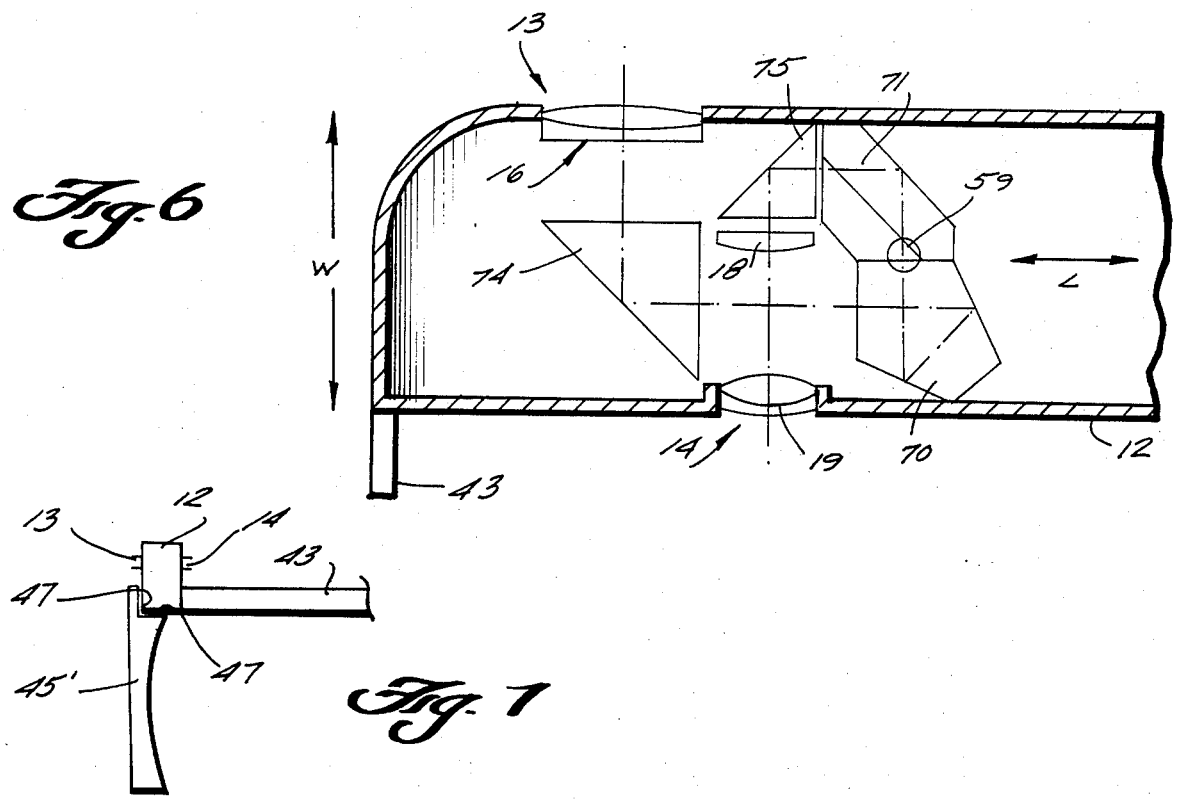

VISION ENHANCING SYSTEM

BACKGROUND AND SUMMARY OF THE INVENTION

The invention relates to a vision enhancing system that provides magnification capabilities while presenting an aesthetically pleasing appearance. Although the invention has other applications, it is primarily to enable low-vision persons to read fine print material, to see blackboard work in educational facilities, and, in general, to provide acceptable distance vision.

There are a large number of low-vision persons, i.e., those having about 20/200 vision. The visual acuity of such individuals is not correctable to better than 20/50 with single-lens systems such as conventional eyeglasses or contact lenses: correction to 20/100 being more typical. Various attempts to enhance the visual acuity of such individuals to 20/20 have resulted in the construction of unsightly and unwieldy optical structures extending forward from the individual's eyes. While such prior attempts were optically effective, the forward extension of the optics provided an awkward impediment to head movement and the weight, being well forward of the nose support, created an unnatural muscular strain.

According to the present invention, apparatus is provided that is capable of correcting the visual acuity of low-vision persons without the drawbacks inherent in prior art attempts. The apparatus according to the present invention is eminently suited for use with conventional eyeglasses, extends no significant distance forward from the eyeglasses, and in fact does not look substantially different from conventional eyeglasses. The system has a small weight (i.e., about 2 ounces or less), is safe and rugged, yet is capable of correcting a low-vision person's sight to 20/20, or close to it. Magnifications on the order of 4X to 8X are readily provided. Utilizing the system according to the present invention, a low-vision person is not immediately identified as such, and thus the system according to the present invention may be utilized without undesirably increasing the self-consciousness of the wearer.

A typical low-vision person has one dominant eye, and the preferred embodiment according to the present invention provides a monocular system for aiding the vision of the dominant eye of the low-vision wearer. However, the invention also has applicability to other than low-vision systems. For instance the basic apparatus according to the present invention may be modified for use in covert surveillance, spectating at sports and cultural events, etc., in either a monocular or binocular form.

According to the present invention, a vision-enhancing apparatus is provided that takes advantage of the distance between the wearer's temples to provide the major optical path, instead of extending it forward from the eyes of the user. By making the optical path parallel to a line between the wearer's temples, it is possible to obtain sufficient magnification while minimizing interference with the user's normal activities and the cosmetic drawbacks normally associated with vision-enhancing systems.

According to one aspect of the present invention, a prismatic telescopic arrangement is provided which includes an elongated casing with a light entry on the side at one end directed forward and a light exit on the opposite side of the casing at the other end directed toward the eye. A prismatic telescopic lens system including an objective, an ocular, and inverting and reversing optical means is mounted within the casing, so that light entering the casing through the light entry is directed down the length of the casing through the lens system and then directed out the light exit. Means are provided for adjusting the focus of the lens system, and means are provided for mounting the objective within the casing so that the majority of the focal length of the objective lies within, and parallel to the direction of elongation, of the casing. Means are provided for mounting the casing on a wearer's head so that the direction of elongation of the casing extends substantially horizontally across the wearer's forehead with the light exit at the wearer's eye. The mounting means preferably comprises an eyeglass frame including a support, nosepiece and ear pieces, with eyeglass lenses disposed in the frame support. Means are provided for mounting the casing on top of the frame support above the lenses and between the ear pieces, with the light entry and eyepiece disposed so that by tilting his/her eyes upward, the wearer can look through the light exit. The casing may be sealed so that dirt, moisture, and the like cannot enter the casing and affect the lens system, and the lens system itself may take a variety of forms depending upon the particular use. While a monocular system is preferred (especially for low-vision systems), a binocular system may be provided consisting of a pair of light entries and light exits into and from the casing, a pair of prismatic telescopic lens systems, a pair of adjustment means, and a pair of objective mounting means.

The apparatus according to the present invention also may be described with respect to the orientation of the first optical element of the lens system within the casing, which redirects light entering from the light entry. The mounting means for mounting the casing on the wearer's head so mounts the casing that the path of light exiting the first optical light redirecting element is substantially horizontal when the wearer is upright, and extends substantially parallel to a line between the wearer's temples, and preferably so that the path of light exiting the first optical light redirecting element is disposed in a substantially horizontal common plane with light in a path entering the light entry when the wearer is upright.

According to another aspect of the present invention, a sight-facilitating apparatus is provided comprising an eyeglass frame including a support, nosepiece, and ear pieces with eyeglass lenses disposed in the eyeglass frame support. An elongated casing including a lens system with an objective and an ocular, with the ocular mounted at one face of the casing, is provided, along with means for mounting the casing on top of the eyeglasses frame support so that the ocular is mounted directly above an eyeglass lens and on the same side of the frame support as the ear pieces. The casing is elongated in a first dimension and shortened in second and third dimensions, the mounting means mounting the casing so that its first dimension extends along the frame support between the ear pieces with the second dimension significantly less than the height of the eyeglass lenses and the third dimension roughly comparable to the second dimension, so that no obtrusive extension of the casing past the eyeglass frames from the wearer's head is provided. The light entry and light exit are disposed on opposite portions of the casing and are spaced in the first dimension a distance greater than the spacing between the pupils of the wearer's eyes. The casing with lens system disposed therein weighs about 2 ounces or less (e.g., 1½ ounces) and is readily capable of providing magnifications of about 4X to 8X. For facilitating fitting of various individuals, the casing may comprise a plurality of detachable modular components.

It is the primary object of the present invention to provide a vision-enhancing device that is aesthetically pleasing yet is capable of readily providing desired magnification, especially for low-vision persons. This and other objects of the invention will become clear from the detailed description of the invention, and from the appended claims.

BRIEF DESCRIPTION OF THE DRAWINGS

FIG. 4 is a modification of the optical components of the apparatus of FIG. 3;

FIG. 5 is a view partly in cross-section and partly in elevation of another emobdiment according to the present invention illustrating a different lens system;

FIG. 6 is a view partly in cross-section and partly in elevation of one-half of a binocular system according to the present invention; and FIG. 7 is a side schematic view illustrating a modified manner of interengagement between conventional eyeglass components and a lens system casing according to the present invention.

DETAILED DESCRIPTION OF THE DRAWINGS

Figure 1:
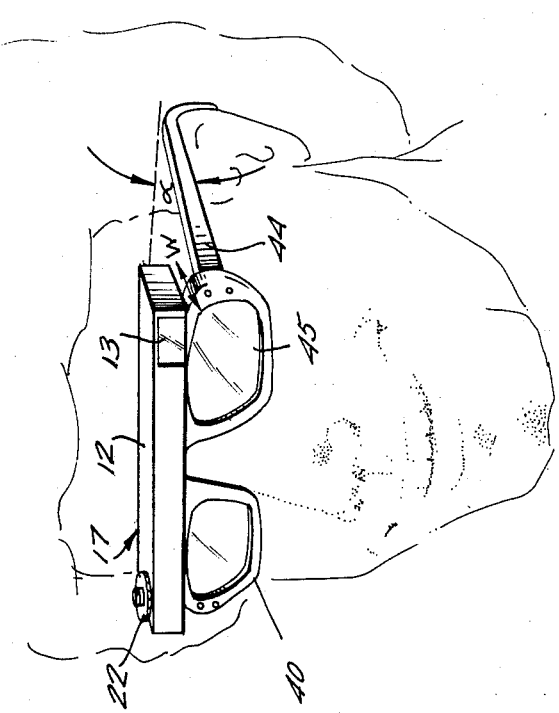
FIG. 1 is a perspective view illustrating an exemplary apparatus according to the present invention in use on a wearer.

Exemplary apparatus according to the present invention is illustrated generally at 10 in the drawings. The major element of the apparatus comprises a casing 12, which preferably is elongated in dimension L, and may be a rectangular parallelepiped. The casing may be made of any suitable material, preferably a lightweight material such as aluminum. Means are provided defining a light entry 13 into the casing, and means are provided defining a light exit 14 (see FIG. 3) from the casing disposed on an opposite portion thereof as the light entry. The casing 12 dimension of elongation L preferably is equal to or less than the distance between a wearer's ears (see FIG. 1), and the casing 12 has shortened second and third dimensions H, W compared to the dimension of elongation L.

The apparatus 10 (see FIG. 3) further comprises a prismatic telescopic lens system, including an objective 16 and an ocular 17 mounted within the casing 12. The objective 16 and the ocular 17 may comprise any suitable lenses. For instance, the objective 16 may comprise an acromat with a focal length of about 66 mm. The ocular 17 preferably includes a field lens 18 and an eye lens 19, and may be of a symmetrical Ramsden type, with a focal length of 12 mm. Inverting and reversing optical means (such as a plurality of prisms as described below with respect to particular embodiments of the lens system) are also provided to direct the light through the lens system and provide an erect image to the eye.

Means are also provided for adjusting the focus of the lens system. Such means may include an actuator 22 extending exteriorly of the casing 12 (see FIGS. 1 and 2) mounted on the "top" surface of the casing 12. In the embodiment illustrated in FIGS. 1 through 4, the actuator 22 is connected to a shaft 23 which extends through a seal (not shown) into the interior of the casing 12, and having a peripheral disc 24 mounted for rotation therewith. A take-up cable 25 is mounted to the circumference of the peripheral disc 24, and frictional engagement between the circumference of the disc 24 and a stationary friction member 27 within the casing 12 maintains the shaft 23 in the position to which it has been rotated. The cable is connected at the end 29 thereof to a block 30 mounted for linear slidable movement within the casing 12 in dimension L, and guided in that path of movement by the walls of the casing 12. A spring 31 is connected at one end 32 thereof to the block 30, and at the other end 33 thereof to the casing 12 to provide spring pressure tending to move the block 30 to the right in FIG. 3.

In all illustrated embodiments, the objective 16 is mounted by appropriate means within the casing 12 so that the majority of the focal length extends parallel to the dimension L (direction of elongation of the casing 12).

Means are provided for mounting the casing 12 on a wearer's head (see FIG. 1) so that the direction of elongation L extends substantially horizontally between the wearer's temples, with the light exit 14 adjacent the wearer's eye. Such mounting means preferably, especially in low-vision applications of the invention, takes the form of a conventional eyeglass frame including a support 40, nosepiece 41, ear pieces 43, 44, and eyeglass lenses 45 mounted by the support 40 (see FIGS. 1 and 2 in particular). Any suitable eyeglass frame style may be provided; alternatively, the casing 12 may comprise an integral part of the top portion of the eyeglass frame. For low-vision systems, the eyeglass frame illustrated in FIG. 1 is desirable since the height of the lenses 45 is relatively small, allowing the casing 12 to be mounted on top of the support 40 and readily be utilized by the wearer tilting his eyes with respect to his head, an angle α (see FIG. 1), much in the same manner that conventional bifocals are utilized.

Figure 2:
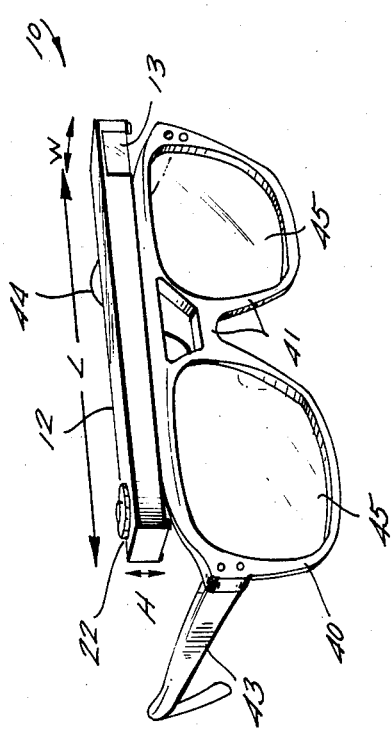
FIG. 2 is a perspective view of a system similar to that of FIG. 1 shown in use with a different style of eyeglass frame.

Preferably the height H of the casing 12 is less than the height of the eyeglass lenses 45, and the width W also is relatively small, preferably small enough so that the casing 12 does not extend in front of the eyeglass lenses 45 any significant extent (see FIGS. 1 and 2).

Typically, the casing 12, with lens system disposed therein, according to the present invention would have a weight of about 2 ounces or less (e.g., 1.5 ounces), and having the relative dimensions with respect to the glass frame 40 illustrated in FIGS. 1 and 2 would not be uncomfortable to wear, and would be aesthetically pleasing, being little more obtrusive than conventional eyeglass frames. Mounting of the casing 12 to the frame support 40 could be accomplished utilizing any suitable conventional fastening means, such as brackets and screws, adhesives, clips, and the like; or (as illustrated in FIG. 7) the casing 12 may actually be integral with and form a portion of the frame support 40. Mounted as illustrated in FIG. 1, the wearer could tilt his head downwardly at angle α (α preferably being about 10°) from a position looking through the eyeglass lenses 45, and would then be able to look through the light exit 14 of the casing 12. The embodiment illustrated in FIGS. 1 through 4 is for a right-eye dominant low-vision person; the construction of a similar structure for a left-eye dominant low-vision person is readily apparent, being a mirror image of the structure illustrated in FIGS. 1 through 4.

The construction according to the present invention is simple and rugged, and because of the construction thereof the casing 12 may be readily sealed so that dirt, moisture, and the like cannot enter the casing and adversely affect the lens system. As illustrated in the drawings, normally the focus adjustment actuator 22 extending outwardly from the casing 12 will be adjacent the light exit 14 (that is associated with the lens 45 corresponding to the dominant eye of the wearer).

A variety of accommodations may be made in the construction of the frame support 40 and the eyeglasses 45 if the eyeglasses are constructed with the casing 12 in mind (although the casing 12 may be readily retrofitted to conventional eyeglasses). For instance, as illustrated in FIG. 7, the eyeglass lenses 45' may be shaped on the upper portions 47 thereof to receive the bottom and front wall of the casing 12, which is integral with frame 40, to help positively locate it, and to decrease the effective height H of the casing 12 above the eyeglasses. Further similar accommodations can be made in the frame 40, with the result that a frame with the casing 12 would have dimensions corresponding to those of conventional eyeglasses.

Figure 3:
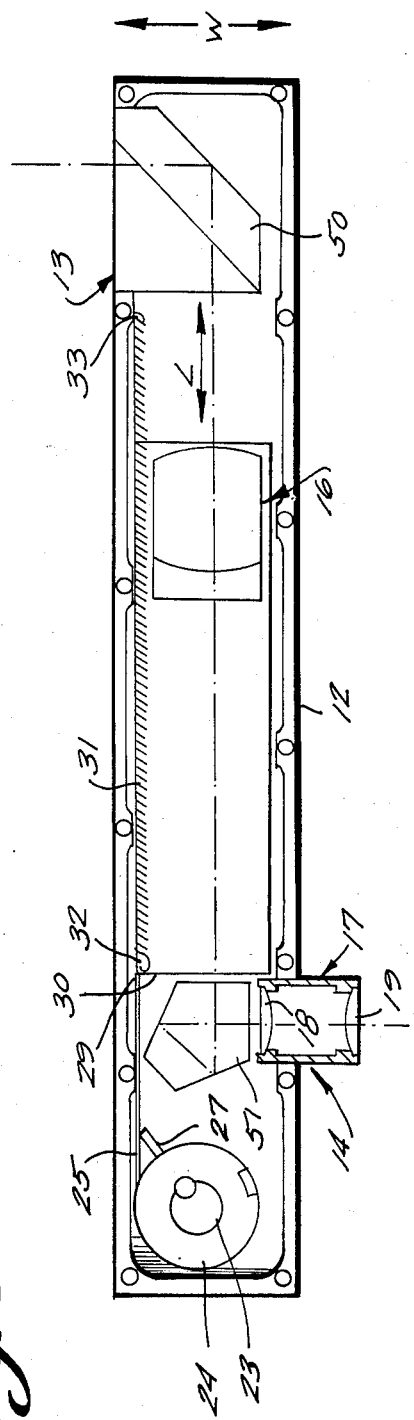
FIG. 3 is a bottom view of the lens system casing of FIG. 1 with the bottom plate removed.

A variety of components may be utilized in the lens system along with the objective 16 and ocular 17 in order to obtain the desired results. Each system will be described in the optical path order from light entry to light exit:

In the embodiment illustrated in FIG. 3, the first light-redirecting optical element comprises an Amici prism 50, then the objective 16, then a pentaprism 51, and then the ocular 17. The ocular 17 is constructed and positioned so that the eye lens 19 extends outwardly from the casing 12.

In the embodiment illustrated in FIG. 4, a flat glass window 52 seals the light entry 13, and instead of the Amici prism 50, a mirror 53 is provided for redirecting the incident light beam so that it exits first optical element 53 in dim L. The objective 16 is next, and then a roof-pentaprism 54 is provided, and finally the ocular 17.

In the embodiment illustrated in FIG. 5, the ocular is fully recessed, the eye lens 19 being flush with the casing 12. In the embodiment of FIG. 5, the first optical element comprises roof-pentaprism 56; objective 16, the field lens 18 of the ocular 17, a right-angle prism 58, and the eye lens 19 of the ocular. In this embodiment, a slide pin 59 is shown schematically for adjusting the position of the objective 16 in dimension L, a frictional engagement being provided between the slide pin 59 where it extends in a sealed manner through the upper wall of the casing 12.

Also in FIG. 5, the casing 12 is shown having a modular construction. The modular construction of the casing allows the ready fitting of the apparatus 10 to a variety of individuals merely by attaching modular components together. For instance in FIG. 5, the casing 12 is shown as including a central modular component 60, and side components 61, 62, with demarcation lines 63, 64, respectively, being provided between the center 60 and side 61 and center 60 and side 62 modules. Different side components 61 may be provided with the eye lens 19 positioned with a particular spacing with respect to the demarcation line 63 to adjust for the particular spacing of the proposed wearer's eyes, and similarly the length of the component 62 may vary depending upon the desired distance between the ear pieces 43, 44. The modular components may be connected together in any suitable manner, such as with snap connections, adhesive, or the like, and sealing material may be provided at the interfaces 63, 64, if desired.

While the apparatus 10 according to the present invention is particularly designed for use by low-vision people, and while a monocular system is normally more practical for low-vision individuals, the apparatus according to the present invention has many other uses. For many of such other uses, and also for some low-vision people, a binocular system is more desirable than a monocular system. One-half of an exemplary binocular system according to the present invention is illustrated in FIG. 6. In this embodiment, the focus adjustment is provided by movement of the pentaprism 70 and Amici prism 71 in dimension L, as by sliding the pin 59' operatively connected to prisms 70, 71 (shown schematically in FIG. 6) with respect to the top of the casing 12. In the binocular embodiment, the light entry 13 and light exit 14 are spaced much more closely along the length L of the casing 12 since two light entries and exits, and two lens systems, adjusting means, etc., must be provided.

A typical optical path for the lens system illustrated in FIG. 6 includes the objective 16; means for deviating the impinging light beam 90° (the first light redirecting optical element) such as the right-angle prism 74 (or a mirror); the modified pentaprism 70; the Amici prism 71; another means for deviating and impinging light beam 90° such as the right-angle prism 75; and then the ocular. Note that the field lens 19 and eye lens 19 of the ocular 17 are not mounted in a common casing as in the FIG. 3 embodiment since such casing would interfere with the light path from prism 74 to pentaprism 70. In this embodiment, like the other illustrated embodiments, the majority of the focal length of the objective 16 is in the dimension L even though a portion of the focal length is in dimension W.

All of the various structures of the apparatus may take a wide variety of forms. For instance, the means for mounting the casing 12 on the wearer's head could comprise a helmet, or comprise clips for clipping onto conventional glasses, or could comprise a holder for bringing the operative components directly into operative relationship with the wearer's eyes (e.g., for binocular sports glasses or the like). Further, the eyeglass lenses may be tinted, ground off, or the like to hide the casing 12 completely or to any desirable extent. Adjustment of the focus of the lens system may be by a sonar system, or other suitable means, and various accessory lenses, mirrors, or the like may be associated with the light entrance 13. For instance, various sliding or pivotal structures such as zoom lenses, mirrors, correcting lenses, tinted transparent plates, or the like may be mounted on casing 12 for movement into and out of operative relationship with the light entry 13. Any number of such structures could be provided depending upon the particular use for the apparatus.

Exemplary apparatus according to the present invention having been described, an exemplary manner of assembly and utilization thereof for a low-vision person will now be set forth:

The various optical components of the lens system are mounted in the casing 12 as illustrated in FIG. 3 and the casing bottom is closed. The casing 12 is then placed on top of a frame support 40 of a conventional pair of eyeglasses, for a right-eye dominant low-vision person, such as by utilizing screws and brackets, to provide the structure illustrated in FIG. 1. The ear pieces 43, 44 are then placed on the wearer's ears in a conventional manner, and the wearer can look through the conventional eyeglass lenses 45.

When it is desired to properly view an object in the distance, the wearer merely tilts his head downwardly or lifts his eyes with respect to his head an angle α, and then the wearer may look through the ocular 17 at the light exit 14 adjacent his dominant right eye. By rotating actuator 22, the position of the objective 16 in dimension L is adjusted, thereby providing focusing on the object viewed. Light entering through light entry 13 passes through Amici prism 50, then through objective 16, through pentaprism 51, and then through ocular 17, providing an upright real image of the object being viewed.

It will thus be seen that according the present invention a vision enhancing system has been provided which makes maximum use of the space surrounding the wearer's eyes to provide desirable magnification with minimum obtrusiveness and minimum discomfort. For low-vision individuals, utilizing the present invention is possible to correct 20/200 vision to about 20/20 so that the individual can read fine print, do blackboard work in conventional educational institutions, and the like. Yet the apparatus according to the invention does not clearly denote the wearer to be a low-vision person, and has satisfactory aesthetic appeal.

While the invention has been herein shown and described in what is presently conceived to the most practical and preferred embodiment, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A prismatic telescopic apparatus comprising
   an elongated casing;
   means defining a light entry into said casing;
   means defining a light exit from said casing disposed on an opposite portion thereof as said light entry;
   a prismatic telescopic lens system including an objective, an ocular, and inverting and reversing optical means mounted within said casing, so that light entering said casing through said light entry passes through said lens system and exits said light exit to provide an upright real image;
   means for adjusting the focus of said lens system;
   means for mounting said objective within said casing so that the majority of the focal length of the objective extends, during use, parallel to the direction of elongation of said casing; and
   means for mounting said casing on a wearer's head so that said direction of elongation of said casing extends substantially horizontally between the wearer's temples, with said light exit adjacent the wearer's eye.

2. Apparatus as recited in claim 1 wherein the length of said elongated casing is not substantially more than the distance between the wearer's temples.

3. Apparatus as recited in claim 2 wherein said mounting means comprises an eyeglass frame including a support, nosepiece, and ear pieces; eyeglass lenses disposed in said eyeglass frame support; and means for mounting said casing on top of said frame support above said lenses and between said ear pieces with said light entry disposed on the opposite side of said support as said ear pieces and said light exit on the same side of said support as said ear pieces.

4. Apparatus as recited in claim 3 wherein said mounting means includes means for locating said casing and eyeglass lenses so that the wearer may look through the eyeglass lenses and then by tilting his/her eyes with respect to his/her head an angle α, look through said light exit.

5. Apparatus as recited in claim 4 wherein said angle α is about 10°.

6. Apparatus as recited in claim 1 wherein said casing is sealed so that dirt, moisture, and the like cannot enter said casing and affect said lens system.

7. Apparatus as recited in claim 1 forming a binocular system consisting of a single said casing, means defining a pair of said light entries, means defining a pair of said light exits, a pair of said prismatic telescopic lens systems, a pair of said means for adjusting the lens systems focus; and a pair of said objective mounting means.

8. Apparatus as recited in claim 1 wherein said means for mounting said objective comprises means for mounting said objective for linear movement within said casing parallel to the direction of elongation thereof, and wherein said adjusting means includes means for effecting movement of said objective linearly within said casing, and includes an actuator extending outwardly from said casing.

9. Apparatus as recited in claim 3 wherein said means for mounting said objective comprises means for mounting said objective for linear movement within said casing parallel to the direction of elongation thereof, and wherein said adjusting means includes means for effecting movement of said objective linearly within said casing, and includes an actuator extending outwardly from said casing.

10. Apparatus as recited in claim 9 wherein said actuator extends outwardly from the top of said casing away from said frame support.

11. Apparatus as recited in claim 1 wherein said lens system includes a pentaprism.

12. Apparatus as recited in claim 1 wherein said lens system includes, mounted in optical path order from said light entry to said light exit, an Amici prism; said objective; a pentaprism; and said ocular.

13. Apparatus as recited in claim 1 wherein said lens system includes, mounted in optical path order from said light entry to said light exit; a 90° reflecting mirror; said objective; an Amici prism and pentaprism; and said ocular.

14. Apparatus as recited in claims 1 or 7 wherein said lens system includes, mounted in optical path order from said light entry to said light exit, said objective; means for deviating an impinging light beam 90°; a pentaprism; an Amici prism; means for deviating an impinging light beam 90°; and said ocular.

15. Apparatus as recited in claims 3 or 4 wherein said ear pieces include first and second ear pieces, and wherein said light entry is disposed at one end of said casing in the direction of elongation thereof adjacent the first ear piece, and wherein said light exit is disposed above one of said eyeglass lenses closer to the second ear piece than said first ear piece.

16. A prismatic telescopic appratus comprising
a casing;
means defining a light entry into said casing on one side thereof;
means defining a light exit from said casing on an opposite side thereof as said light entry;
a prismatic telescopic lens system including an objective, an ocular, and reversing and inverting optical means mounted within said casing so that light entering said casing through said light entry passes through said lens system and exits said light exit; said lens system including a first optical element within said casing for redirecting light entering said light entry; and
means for mounting said casing on a wearer's head so that said light entry faces forwardly on the wearer's head, and so that the path of light exiting said first optical light redirectly element is substantially horizontal during use when the wearer is upright, and extends substantially parallel to a line between the wearer's temples.

17. Apparatus as recited in claim 16 wherein said mounting means further comprise means for mounting said casing on a wearer's head so that the path of light exiting said first optical light-redirecting element is disposed in a substantially horizontal common plane with light in a path entering said light entry when the wearer is upright.

18. Apparatus as recited in claim 17 further comprising means for adjusting the focus of said lens system, said means including an actuator element extending vertically upwardly from said casing when the wearer is upright.

19. Apparatus as recited in claims 1 or 16 wherein said ocular eye lens is flush with said casing.

20. Apparatus as recited in claims 1 or 16 wherein said ocular eye lens extends outwardly from said casing toward a wearer's eye.

21. A sight-facilitating apparatus comprising
an eyeglass frame including a support, nosepiece, and ear pieces;
eyeglass lenses disposed in said eyeglass frame support;
an elongated casing containing a lens system including an objective and an ocular, said ocular mounted at one face of said casing and a light opening to said lens system mounted on an opposite face of said casing from said ocular; and
means for mounting said casing on top of said eyeglass frame support so that said ocular is mounted directly above an eyeglass lens and on the same side of said frame support as said ear pieces.

22. Apparatus as recited in claim 21 wherein said casing is elongated in a first dimension, and shortened in second and third dimensions, and wherein said mounting means mounts said casing so that its first dimension extends along the frame support between the ear pieces.

23. Apparatus as recited in claim 22 wherein said second dimension is significantly less than the height of said eyeglasses lenses.

24. Apparatus as recited in claim 23 wherein said mounting means include means for locating said casing and eyeglass lenses so that the wearer may look through the eyeglass lenses and then by tilting his/her eyes with respect to his/her head an angle α, look through said light exit.

25. Apparatus as recited in claim 24 wherein said casing includes a light entry located on the opposite side of said casing as said ocular.

26. Apparatus as recited in claim 25 consisting of a monocular low-vision system, and wherein said light entry is located on an end of said casing most remote from the eyeglass lens with which said ocular is associated.

27. Apparatus as recited in claim 25 consisting of a monocular low-vision system, and wherein said light entry and said light exit are spaced in said first dimension a distance greater than the spacing between the pupils of the wearer's eyes.

28. Apparatus as recited in claim 21 wherein said prismatic telescopic lens system mounted within said casing also includes inverting and reversing optical means for providing an upright image.

29. Apparatus as recited in claim 28 consisting of a monocular low-vision system, and wherein said light entry is located on an end of said casing most remote from the eyeglass lens with which said ocular is associated.

30. Apparatus as recited in claim 28 consisting of a monocular low-vision system, and wherein said light entry and said light exit are spaced in said first dimension a distance greater than the spacing between the pupils of the wearer's eyes.

31. Apparatus as recited in claims 3 or 21 wherein said casing is integral with said eyeglass frame support.

32. Apparatus as recited in claims 1, 16, or 21 wherein said casing, with lens system disposed therein, weighs about 2 ounces or less.

33. Apparatus as recited in claims 1, 16, or 21 wherein said lens system is capable of providing magnifications of about 4X to 8X.

34. Apparatus as recited in claims 1, 16, or 21 wherein said casing comprises a plurality of modular componen,ts.

35. Apparatus as recited in claim 23 wherein said third dimension is about the same length as said second dimension, and wherein said casing does not extend any significant amount past the front of the eyeglass lenses away from the wearer's head.

36. Apparatus as recited in claims 3, 21, or 23 wherein said eyeglass lenses are magnifying lenses.

37. A prismatic telescopic apparatus comprising: a casing; means defining a light entry into said casing; means defining a light exit from said casing; a prismatic telescopic lens system including an objective, an ocular, and reversing and inverting optical means mounted within said casing so that light entering said casing through said light entry passes through said lens system and exits said light exit; said lens system including a first optical element within said casing for redirecting light entering said light entry; means for adjusting the focus of said lens system, said means including an actuator element extending vertically upwardly from said casing when the wearer is upright, a rotatable disc operatively mounted to said actuator element; a block mounted for linear slideable movement within said casing and containing an element of said lens system; and a take-up cable mounted to the circumference of the periphery of said disc and to said block; and
means for mounting said casing on a wearer's head so that the path of light exiting said first optical light redirecting element is substantially horizontal during use when the wearer is upright, and extends substantially parallel to a line between the wearer's temples.

* * * * *